United States Patent [19]
Scandrett

[11] 3,862,114
[45] Jan. 21, 1975

[54] ANALOGS OF SUBSTANCE P
[75] Inventor: Mal Scott Scandrett, Elwood, Victoria, Australia
[73] Assignee: ICI Australia Limited, Victoria, Australia
[22] Filed: Sept. 12, 1972
[21] Appl. No.: 288,337

[30] Foreign Application Priority Data
Nov. 22, 1971   Australia.............................. 7106/71
July 25, 1972   Australia.............................. 9835/72

[52] U.S. Cl............................... 260/112.5, 424/177
[51] Int. Cl... C07c 103/52, C07g 7/00, A61k 27/00
[58] Field of Search................................... 260/112.5

[56] References Cited
OTHER PUBLICATIONS
Chillemi, Gazz. Chim. Ital., 93, 1079–1092 (1963).
Sandrin et al.: Helv. Chim. Acta, 47, 417–440 (1964).
Schröder et al.: Experientia, 20, 19–21 (1964).
Lübke et al.: Justusliebigs Ann. Chem., 679, 195–206, (1964).
Goffredo et al.: Gazz. Chim. Ital., 95, 172–184, (1965).
Lübke et al.: Experientia, 21, 84–87, (1965).
Niedrich, Chem. Ber., 100, 3273–3282, (1967).
Chang et al.: Nature New Biol., 232, 86, (1971), cited from CA75:84245t.
Chillemi et al.: Gazz. Chim. Ital., 94, 891–,(1964).
J. M. Stewart and Janis Young: "Solid Phase Peptide Synthesis," Freeman and Co., San Francisco, 1966, pp. 1–7.

Primary Examiner—Lewis Gotts
Assistant Examiner—Reginald J. Suyat
Attorney, Agent, or Firm—Cushman, Darby & Cushman

[57] ABSTRACT

A peptide having between 3 and 12 inclusive amino acid residues wherein the carboxy terminal end of the peptide comprises the amino acid sequence of general formula 1:

$$R - R^3 - R^2 - R^1 - NH_2$$

$R^3$ is glycine, $R^2$ is L-leucine, $R^1$-$NH_2$ is L-methionine amide, L-methionine sulphoxide amide, L-methionine sulphone amide, or L-seleno methionine amide, R is a peptide fragment containing 0 to 9 amino acid residues, except that the peptide of general formula 1 cannot be 'Substance P' and that when present the 4th amino acid residue from the carboxy terminal end is L-phenylalanine, L-tyrosine or L-isoleucine, the 5th amino acid residue is L-phenylalanine, or L-tyrosine, the 6th amino acid residue is L-glutamine, L-tyrosine, L-lysine or L-alanine, the 7th amino acid residue is L-glutamine, L-tyrosine, L-asparagine or L-aspartic acid, the 8th amino acid residue is L-lysine, L-proline or L-tyrosine, the 9th amino acid residue from the carboxy terminal end is L-lysine, L-tyrosine, L-aspartic acid or L-serine, the 10th amino acid residue is L-proline, L-alanine or L-tyrosine, the 11th amino acid residue is L-pyroglutamic, L-glutamine L-tyrosine or L-arginine and that the 12th amino acid residue is L-tyrosine.

16 Claims, No Drawings

ANALOGS OF SUBSTANCE P

This invention is related to peptides having pharmaceutical activity and in particular it relates to analogues of "Substance P."

Chang and Leeman (J. Biol. Chem., 245,4784 (1970)) reported the isolation of a sialogogic peptide from bovine hypothalami. This peptide is the so-called "Substance P" of von Euler and Gaddum (J. Physiol. (London), 72,74, (1931)) which was found to exist in considerable quantities in the intestine and brain. Crude extracts were shown to produce cardiovascular effects in experimental animals. Recently the amino acid sequence of "Substance P" has been defined and the molecule synthesised, (S. E. Leeman, M. M. Chang, H. D. Niall, G. W. Tregear, J. T. Potts, Nature (New Biology) 232, 86, (1971)).

"Substance P" has been found to produce a lowered arterial blood pressure and cause vasodilatation when injected into anaesthetised animals. "Substance P" is thus a potentially valuable pharmaceutical agent. We have now discovered that certain analogues and fragments of "Substance P" also exhibit extremely high pharmaceutical activity. These analogues and fragments although similar in pharmaceutical action to "Substance P" have modified structures which make them useful in medical treatment or diagnosis.

Accordingly we provide a peptide having between 3 and 12 inclusive amino acid residues wherein the carboxy terminal end of the peptide comprises the amino acid sequence of general formula I:

$$R - R^3 - R^2 - R^1 - NH_2 \quad (1)$$

$R^3$ is glycine, $R^2$ is L-leucine, $R^1 - NH_2$ is L-methionine amide, L-methionine sulphoxide amide, L-methionine sulphone amide, norleucine, L-seleno methionine amide, homocysteine or homocysteine derivatives, R is a peptide fragment containing 0 to 9 amino acid residues, except that the peptide of general formula I cannot be "Substance P" and that when present the 4th amino acid residue from the carboxy terminal end is L-phenylalanine, L-tyrosine or L-isoleucine, the 5th amino acid residue is L-phenylalanine, or L-tyrosine, the 6th amino acid residue is L-glutamine, L-tyrosine, L-lysine or L-alanine, the 7th amino acid residue is L-glutamine, L-tyrosine, L-asparagine or L-aspartic acid, the 8th amino acid residue is L-lysine, L-proline or L-tyrosine, the 9th amino acid residue from the carboxy terminal end is L-lysine, L-ornithine, L-homolysine, L-tyrosine, L-aspartic acid or L-serine, the 10th amino acid residue is L-proline, L-alanine or L-tyrosine, the 11th amino acid residue is L-pyroglutamic, L-glutamine, L-tyrosine, L-arginine, L-homoarginine or citrulline and that the 12th amino acid residue is L-tyrosine.

The N-terminal amino acid residue is optionally D. The use of D-amino acids at the amino terminus may prolong or modify activity because of the increased resistance to aminopeptidase.

Preferred compounds according to our invention are the compounds shown in Table I.

TABLE I

| Compound | L - Amino Acid Sequence | | | | | | | | | | | |
|---|---|---|---|---|---|---|---|---|---|---|---|---|
| 1 | O | R | P | K | P | Q | Q | F | F | G | L | M-NH₂ |
| 2 |   | R | P | K | P | Q | Q | F | O | G | L | M-NH₂ |
| 3 |   |   | O | P | Q | Q | F | F | G | L | M-NH₂ |  |
| 4 |   |   |   | P | Q | Q | F | F | G | L | M-NH₂ |  |
| 5 |   |   |   | P | Q | Q | F | O | G | L | M-NH₂ |  |
| 6 |   |   |   |   | Q | Q | F | F | G | L | M-NH₂ |  |
| 7 |   |   |   |   | D | A | F | O | G | L | M-NH₂ |  |
| 8 |   |   |   |   |   | Q | F | F | G | L | M-NH₂ |  |
| 9 |   |   |   |   |   | A | F | Q | G | L | M-NH₂ |  |
| 10 |   |   |   |   |   |   | F | F | G | L | M-NH₂ |  |
| 11 |   |   |   |   |   |   | O | F | G | L | M-NH₂ |  |
| 12 |   |   |   |   |   |   | G | F | G | L | M-NH₂ |  |
| 13 |   |   |   |   |   |   |   | F | G | L | M-NH₂ |  |
| 14 |   |   |   |   |   |   |   | O | G | L | M-NH₂ |  |
| 15 |   |   |   |   |   |   |   |   | G | L | M-NH₂ |  |

In the above table the amino acid residues are named and numbered according to IUPAC/IUB nomenclature wherein A is L-alanine, D is L-aspartic acid, F is L-phenylalanine, G is L-glycine, K is L-lysine, L is L-leucine, O is L-tyrosine, P is L-proline, Q is L-glutamine, R is L-arginine, and M-NH₂ is L-methionine amide.

Preferably the peptide contains from 4 to 6 amino acid residues. Most preferably five amino acid residues.

Thus the pentapeptide compounds 10, 11 and 12 of Table I are of particular interest as they show particularly high biological activity for peptides containing only five amino acid residues.

In further aspect of our invention we provide a process for the synthesis of a peptide of general formula 1 as defined hereinbefore which comprises sequential processes of amino acid couplings.

The new compounds of our invention may be prepared by analogous methods to those normally used for peptide synthesis. Preferably the new compounds are prepared by the solid phase procedure of Merrifield, J.A.C.S., 85 2149, (1963) and preferably using a pellicular graft copolymer support. (Potts, Tregear at al, Proceedings Nat. Academy, Science, December 1971).

According to a further feature of the invention there is provided a pharmaceutical or veterinary composition which comprises at least one peptide of general formula I as defined hereinabove and a pharmaceutically or veterinarily acceptable diluent or carrier.

The pharmaceutical and veterinary compositions may contain conventional excipients and may be obtained by the application of conventional techniques. The compositions may be of use therapeutically in the treatment of acute and chronic hypertension, and also of any pathological condition attributed to a natural lack of 'Substance P' or a state of inability to utilise 'Substance P.'

The compositions are also of use in clinical diagnosis, in radioimmunological and in competitive binding assays of 'Substance P'.

The compounds of our invention containing L-tyrosine are of particular use in assaying when the tyrosine is tracer labelled with $I^{125}$ or $I^{131}$. All analogues may also be synthesised with a portion of L-methionine being replaced by seleno methionine possessing a $Se^{75}$ labelled atom.

The invention is illustrated by but by no means limited to the following examples:

EXAMPLE 1

Synthesis of Compounds (1), (2), (3), (4), (5) and 'Substance P'

General

The compounds were synthesised on a pellicular solid phase support of beads of poly(trifluorochloroethylene) grafted with styrene to give 11% polystyrene by weight.

The functional group of the solid phase was the benzhydrylamine type as described by P. Pietta and G. Marshall, Chem. Comm., 650 (1970) of the synthesis of peptides with a carboxyl terminal amide. The beads were approximately BSS 150-200 mesh size and contained an estimated 0.7 mM/gm of available amine. General procedures used were those outlined in J. Stewart & J. Young, "Solid Phase Peptide Synthesis" (1969), W. H. Freeman & Co., San Francisco, as applied to solid phase peptide synthesis.

Abbreviations

The following abbreviations will be used and should be interpreted as follows:

| | |
|---|---|
| tBOC | tertiary butoxy carbonyl |
| MeCl | methylene chloride |
| PNP | para nitrophenyl |
| DCC | dicyclo A. carbodiimide |
| BHR | benzhydrylamine resin |
| DMF | dimethyl formamide |
| TFA | trifluoroacetic acid |
| HBT | 1-hydroxy benzo triazole | tBOC protecting groups were used on alpha amino functions of all amino acids.

Other side functions were protected as follows; guanidino group of L-arginine as the nitro derivative; the epsilon amino group of L-lysin and the hydroxyl group of L-tyrosine as the carbobenzoxy and benzyl derivatives respectively.

All of these protective groups were removed by anhydrous HF during cleavage of the completed peptides from the solid phase. The HF cleavage at the same time formed the C terminal amide derivative of the peptide.

tBOC L-methionine was coupled to the benzhydrylamine derivative of the solid phase support with DCC in methylene chloride and the remaining unreacted amine groups on the resins were acetylated.

Removal of the tBOC group from methionine and subsequent amino acids was effected with 4N HCl in dioxan containing 1% mercapto ethanol as antioxidant. In the case of the glutamine residues however 50% trifluoro acetic acid in methylene chloride was used to avoid chain termination through the formation of amino terminal pyrrolidone carboxylic acid. Generally DCC was used as the coupling reagent and 1-hydroxy benzotriazole was added to prevent acyl urea formation and ensure greater yields at each coupling — (W. Konig and R. Geiger, "Peptides" (1969), North Holland Pub. Co.). DCC and tBOC amino acid were added in 2.5 molar excess of available attachment sites and the HBT in 5 molar excess. Completeness of coupling was monitored by the ninhydrin procedure of E. Kaiser et al, Anal. Biochem, 34, 595 (1970), and where necessary, the reaction either prolonged or repeated.

In the case of L-glutamine, this amino acid was added as the PNP ester in a medium of DMF using a 4 molar excess of tBOC L-glutamine and an 8 molar excess of 1,2,4,triazole as catalyst.

PROCEDURE

The benzhydrylamine resin, 8.47g, containing a total of 6mM of amine was reacted with 3.74g tBOC-L-methionine, 4.05g 1-hydroxy benzotriazole and 3.09g DCC in 20 ml MeCl at room temperature in a cylindrical reaction vessel rotated about the longitudinal axis.

After 16 hours the resin was washed five times with methylene chloride (30 ml), five times with DMF (30 ml) and acetylated using 20 ml of DMF containing 2.5 ml acetic anhydride and 0.75 ml triethylamine for 20 minutes. This was followed by five washes of DMF (30 ml), four washes of dioxan containing 1% mercapto ethanol and reacted for 30 minutes at room temperature with 25 ml of 4N HCl in dioxan containing 1% mercapto ethanol.

The resin was washed 6 times with dioxan and four times with chloroform before and after neutralising with 30 ml of 10% v/v triethylamine/chloroform. All solvent transfers were performed under pressure of dry nitrogen to maintain an inert atmosphere and prevent oxidation of the L-methionine.

The resin with deprotected methionine was washed three times with methylene chloride and reacted with 3.47 g of tBOC L-leucine, DCC and HBT for six hours and subsequently treated using the same procedures as above except for elimination of the acetylation step with its consequent washes.

The deprotected L-leucyl, L-methionine BHR was treated with 2.63 g tBOC glycine, DCC and HBT for 8 hours after which the tBOC-glycyl-L-leucyl-L-methionine BHK was dried under vacuo and divided into six equal weight portions each containing approximately 1 mM peptide. These were used for the synthesis of 'Substance P' and each of the compounds (1), (2), (3), (4) and (5) the structures of which appear in the table. Subsequent additions were performed in the same manner for glycine and L-leucine; the L-glutamine however was added in 4 molar excess along with 8 molar excess of 1,2,4-triazole in 20 ml DMF. L-glutamine was reacted as the PNP ester and required DMF washes in place of the MeCl used in DCC couplings.

At the termination of synthesis the resin peptides were dried in vacuo and cleaved in 15 ml anhydrous HF at 0°C for 1 hour using 50 molar excess anisole as protective agent.

The HF was removed in vacuo and the resin peptide mixture dried over KOH to remove the last traces of HF.

Extraction with 98% acetic acid, dilution and lyophilisation produced the white powder of each peptide in approximately 80% yield based on available amine group of the original resin.

EXAMPLE 2

Synthesis of F-F-G-L-M-NH$_2$ (Compound No. 10). The flow diagram shown below illustrates the synthesis of Compound 10.

| F | F | G | L | M |
|---|---|---|---|---|
|   |   |   | BOC | H | BHR |
|   |   |   | BOC |   | BHR |
|   |   | BOC | H |   | BHR |
|   |   | BOC |   |   | BHR |
|   | BOC | H |   |   | BHR |

-Continued

| F | F | G | L | M |
|---|---|---|---|---|
|  | BOC |  |  | BHR |
| BOC | H |  |  | BHR |
| BOC |  |  |  | BHR |
| H |  |  |  | NH₂ |

The compound was synthesised according to the general procedure of Example 1. An amount of BHR (1.11 g) containing 0.26 mM/g of amine was reacted with 178 mg tBOC L-methionine in 5 ml MeCl in the presence of 148 mg DCC and 194 mg HBT dissolved in DMF.

After 12 hours the resin was washed six times with MeCl and the tBOC methionyl resin deprotected by reacting with 15 ml of 40% v/v TFA/MeCl. The deprotected derivatives was washed six times with MeCl and neutralised with 15 ml of 10% v/v triethylamine/MeCl.

This was then washed six times with MeCl (20 ml).

L-M-BHR Using the same quantities of DCC and HBT as above the M-BHR was reacted on the same manner with 165 mg tBOC L-leucine for 8 hours followed by deprotection.

G-L-M-BHR 125 mg tBOC-glycine was used and the reaction completed after 10 hours.

F-F-L-M-BHR In the same manner, this derivative was formed by two successive cycles using 190 mg each of tBOC L-phenylalanine. Weight of F-F-L-M-BHR before cleavage was 1.260 gm.

Cleavage at 0°C for 1 hour using 5 ml anhydrous liquid HF produced 143 mg peptide after extraction and lyophilisation.

Calculated yield based on available amine 81.5 percent.

The peptide was obtained as a white powder m.p. 96.5° – 97°C. The amino acid analysis was as follows:

| Amino acid | Observed μ m's | Molar ratio Methionine = 1 | Theoretical molar ratio |
|---|---|---|---|
| Ammonium | 0.637 | 1.08 | 1 |
| Methionine | 0.594 | 1.00 | 1 |
| Leucine | 0.628 | 1.05 | 1 |
| Glycine | 0.591 | 1.00 | 1 |
| Phenylalanine | 1.047 | 1.76 | 2 |

The mass spectrum of the pentapeptide was consistent with the theoretical structure except that the total molecular ion was not present possibly due to the formation of the methionine sulphoxide salt during permethylation (D. W. Thomas et al Biochem. Biophys. Res. Comm. 32, 519 (1968)).

EXAMPLE 3

Compound Nos. 6 – 9 and 11 – 15 were made by analogous methods to those described in Examples 1 and 2.

EXAMPLE 4

A solution of each peptide was made up in isotonic saline to a concentration of 2.5 mg/ml acidified with a drop of glacial acetic acid and filtered through a 5 micron PTFE porous filter membrane.

Two white male rats weighing approximately 120 g were given an i.p. injection of "Nembutal" 40 mg/Kg and after warming their tails to about 45°C were given an i.v. injection of 15 microlitres of the solution at intervals of 30 minutes through the dorsal caudal vein. "Substance P" and each of the compounds 1, 2, 3, 4 and 5 caused secretion of copious amounts of saliva within 30 seconds and generally the salivation lasted for a period of 3 minutes.

Since this sialogogic activity is associated directly with smooth muscle stretch and hypertensive action (S. Leeman and R. Hammerschlag Endocrinology, 81, 803, (1967)) this test was taken as an indication of positive activity.

"Substance P" and compound (3) were injected into an in vivo rabbit preparation of angiotensin induced hypertension. Both of these compounds in microgram quantities reversed that hypertensive state.

EXAMPLE 5

This example demonstrates the biological actions of compounds 1 to 15 in dogs. Mongrel dogs weighing 12 – 15 Kg of both sexes and in the age group 1 – 3 years were used. Morphine 120 mg/kg was given as a pre-anaesthetic and this was followed by "Chloralose," 2 mg/Kg as general anaesthetic.

Peptide analogues were made up in stock solution containing 10 micrograms/ml with sterile isotonic saline and diluted appropriately with sterile isotonic saline for injection.

Infusion at 1 ml/minute of solutions equivalent to dosages in the range 10 – 150 nanograms per minute were given via the carotid, femoral and vertebral arteries, and the femoral vein over a five minute period.

The transient decrease in arterial pressure in the femoral artery was measured before physiological compensation occured.

The results are shown in Table 3:

TABLE 3

| Compound | Infusion of 75 ng/min Mean fall arterial pressure* | Infusion of 150 ng/min Mean fall arterial pressure * | |
|---|---|---|---|
| 1 | 3 | 3 | |
| 2 | 3 | 3 | |
| 3 | 3 | 3 | |
| 4 | 3 | 3 | |
| 5 | 3 | 3 | |
| 6 | 3 | 3 | |
| 7 | 3 | 3 | tachycardia was |
| 8 | 3 | 3 | randomly observed |
| 9 | 3 | 3 | with 150 n.gm/min |
| 10 | 3 | 3 | infusion with some |
| 11 | 3 | 3 | of the compounds. |
| 12 | 3 | 3 | 1 12 |
| 13 | 2 | 2 | |
| 14 | 2 | 2 | |
| 15 | 1 | 1 | |

*
3 = 10 ± 2mm Hg
2 = 5 ± 1.5mm Hg L6 1 = less than 3.5mm Hg
*
3= 20 mm ± 3mm Hg
2 = 10 mm ± 4mm Hg
1 = less than 6 mm Hg

EXAMPLE 6

This example describes a convenient biological assay which is based on the observation that an increased blood flow through major peripheral arteries occurs at the same time as the hypotensive response as in Example 5.

This assay was used to estimate potency of differnt peptides and to isolate fractions with activity from each analogue after column chromatographic purification. The test animal was prepared and solutions made up as in Example 5 above. Solutions were made up and injected in 0.1 ml amounts followed by 1 ml of sterile isotonic saline.

Blood flow was measured in the exposed femoral artery on right and left sides at random by two "EMI" flow meter probes apposed on opposite sides of artery.

The measurement site was approximately 10 cm distal to the bifurcation of the iliac artery and injection approximately 4 cm proximal to the measurement site. Flow was recorded on a "Grass" polygraph recorder.

The results are shown in Table 4.

TABLE 4

| Compound | Amount of Compound * to produce threshold response |
|---|---|
| 1 | 3 |
| 2 | 3 |
| 3 | 3 |
| 4 | 3 |
| 5 | 3 |
| 6 | 3 |
| 7 | 3 |
| 8 | 3 |
| 9 | 3 |
| 10 | 3 |
| 11 | 3 |
| 12 | 3 |
| 13 | 2 |
| 14 | 2 |
| 15 | 1 |

* 
3 - Threshold response after from $1 \times 10^{-15}$ to $20 \times 10^{-15}$ g/kg body weight injection.
2 - Threshold response after from $1 \times 10^{-6}$ to $10 \times 10^{-6}$ g/kg body weight injection.
1 - Threshold response after $1 \times 10^{-6}$ to $1 \times 10^{-3}$ g/kg body weight injection.

EXAMPLE 7

The general procedure of Example 6 was repeated in a comparison of the potency of natural "Substance P" and eledoisin with the potency of compound Nos. 10, 13 and 15. In Table 5 the average blood flow is given for eight replicated experiments at each dose rate.

TABLE 5

| -Log dose in g. | Natural "Substance P" | Natural Eledoisin | Blood Flow ml/min. Compound No. 10 | Compound No. 13 | Compound No. 15 |
|---|---|---|---|---|---|
| 13 | 1 | | | | |
| 12 | 2 | | | | |
| 11 | 6 | | | | |
| 10 | 14 | 1 | 1 | | |
| 9.7 | 24 | — | — | | |
| 9.3 | 41 | 10 | — | | |
| 9 | 49 | 12 | 2 | | |
| 8.7 | 53 | — | — | | |
| 8.3 | 54 | 36 | 16 | | |
| 8.0 | 60 | 42 | 21 | 0 | |
| 7.7 | | | 31 | — | |
| 7.3 | | | 39 | — | |
| 7.0 | | | 45 | 9 | |
| 6.3 | | | | 20 | |
| 6 | | | | 22 | 6 |
| 5.3 | | | | | 12 |
| 5 | | | | | 25 |

I claim:

1. A peptide having between 4 and 12 inclusive amino acid residues wherein the carboxy terminal end of the peptide comprises the amino acid sequences of formula I:

R — Gly — Leu — Met — NH₂    I wherein R is a peptide fragment containing 1 to 9 amino acid residues, except that the peptide of formula I cannot be Arg-Pro-Lys-Pro-Gln-Gln-Phe-Gly-Leu-Met-NH2 and that the 4th amino acid residue from the carboxy terminal end is phenylalanine or tyrosine, when present the 5th amino acid residue is phenylalanine, glycine or tyrosine, when present the 6th amino acid residue is glutamine, or when the 4th amino acid residue is tyrosine the 6th amino acid residue may be alanine, when present the 7 th amino residue is glutamine or aspartic acid, when present the 8th amino acid residue is proline, when present the 9th amino acid residue is lysine or tyrosine, when present the 10th amino acid residue is proline, when present the 11th amino acid residue is arginine, and that when present the 12th amino acid residue is tyrosine, and wherein all amino acid residues are of the L configuration.

2. A peptide according to claim 1 which consists of from 4 to 6 amino acid residues.

3. The peptide Tyr - Arg - Pro - Lys - Pro - Gln - Gln - Phe - Phe - Gly - Leu - Met - NH₂ wherein all the amino acid residues are of the L configuration.

4. The peptide Arg - Pro - Lys - Pro - Gln - Gln - Phe - Tyr - Gly - Leu - Met - NH₂ wherein all the amino acid residues are of the L configuration.

5. The peptide Tyr - Pro - Gln - Gln - Phe - Phe - Gly - Gln - Met - NH₂ wherein all the amino acid residues are of the L configuration.

6. The peptide Pro - Gln - Gln - Phe - Phe - Gly - Leu - Met - NH₂ wherein all the amino acid residues are of the L configuration.

7. The peptide Pro - Gln - Gln - Phe - Tyr - Gly - Leu - Met - NH₂ wherein all the amino acid residues are of the L configuration.

8. The peptide Gln - Gln - Phe - Phe - Gly - Leu - Met - NH₂ wherein all the amino acid residues are of the L configuration.

9. The peptide Asp - Ala - Phe - Tyr - Gly - Leu - Met - NH₂ wherein all the amino acid residues are of the L configuration.

10. The peptide Gln - Phe - Phe - Gly - Leu - Met - NH₂ wherein all the amino acid residues are of the L configuration.

11. The peptide Ala - Phe - Tyr - Gly - Leu - Met - NH₂ wherein all the amino acid residues are of the L configuration.

12. The peptide Phe - Phe - Gly - Leu - Met - NH₂ wherein all the amino acid residues are of the L configuration.

13. The peptide Tyr - Phe - Gly - Leu - Met - NH₂ wherein all the amino acid residues are of the L configuration.

14. The peptide Gly - Phe - Gly - Leu - Met - NH₂ wherein all the amino acid residues are of the L configuration.

15. The peptide Phe - Gly - Leu - Met - NH₂ wherein all the amino acid residues are of the L configuration.

16. The peptide Tyr - Gly - Leu - Met - NH₂ wherein all the amino acid residues are of the L configuration.

* * * * *